Aug. 23, 1927.                                                     1,640,018
B. WYLAM ET AL
PROCESS OF PREPARING VAT DYESTUFF DERIVATIVES FROM VAT
DYESTUFFS AND ALKYL ESTERS OF MONOCHLORACETIC ACID
Filed Aug. 19, 1926

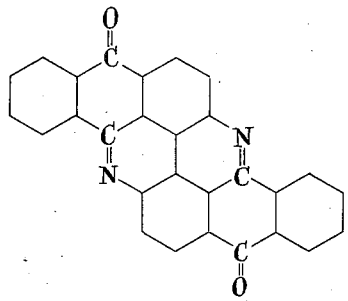

Fig.1.

*Flavanthrone:* Caledon Yellow G, $C_{28}H_{12}N_2O_2$

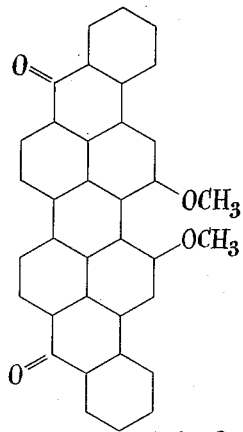

Fig.2.

*Dimethoxydibenzanthrone:* Caledon Jade Green, $C_{36}H_{20}O_4$

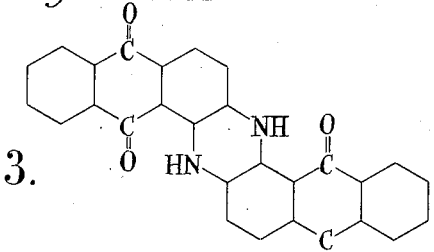

Fig.3.

*Indanthrone:* Caledon Blue R,
N-dihydro-1.2.1'.2'.-anthraquinoneazine, $C_{28}H_{14}N_2O_4$

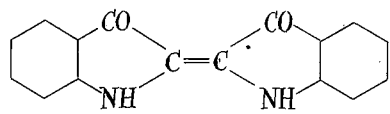

*Indigo:* $C_{10}H_{10}N_2O_2$

Fig.4.

B. Wylam, J.E.G. Harris
& J. Thomas
INVENTORS

By: Marks & Clerk
ATTYS.

Patented Aug. 23, 1927.

1,640,018

UNITED STATES PATENT OFFICE.

BIRKETT WYLAM, OF LANCASTER, JOHN EDMUND GUY HARRIS, OF CARLISLE, ENGLAND, AND JOHN THOMAS, OF GRANGEMOUTH, SCOTLAND, ASSIGNORS TO SCOTTISH DYES, LIMITED, OF GRANGEMOUTH, SCOTLAND.

PROCESS OF PREPARING VAT-DYESTUFF DERIVATIVES FROM VAT DYESTUFFS AND ALKYL ESTERS OF MONOCHLORACETIC ACID.

Application filed August 19, 1926, Serial No. 130,358, and in Great Britain August 5, 1925.

This invention relates to the production of derivatives of vat dyestuffs and has for its object to provide improved or modified derivatives or improved or modified methods of making vat dyestuff derivatives direct from vat dyestuffs.

The invention consists in the process according to which vat dyestuffs are acted upon with an alkyl ester of monochloracetic acid in the presence of a tertiary organic base of the type of pyridine or quinoline or a homologue of these bodies and a suitable metal, for example zinc.

The invention includes the employment in a process as indicated in the preceding paragraph of a diluent to replace part of the tertiary organic base referred to therein.

The invention also consists in the subsequent treatment of derivatives prepared according to either of the two preceding paragraphs with alkali.

The invention includes the employment of derivatives obtained by alkaline extraction according to the preceding paragraph for the dyeing or printing of textile fibres.

The invention also consists in vat dyestuff derivatives including products of alkaline extraction and also dyed and printed materials which may be prepared by processes substantially described as herein or by their equivalents.

The accompanying diagrammatic drawings illustrate the empirical and graphical formulæ according to conventional notation and as far as is known of certain of the starting materials referred to below as follows:—

Figure 1 applies to flavanthrone; trade name Caledon yellow G, constitutional formula $C_{28}H_{12}N_2O_2$.

Figure 2 applies to dimethoxydibenzanthrone; trade name Caledon jade green, empirical formula $C_{36}H_{20}O_4$.

Figure 3 applies to indanthrone; trade name Caledon blue R, N-dihydro-1.2.1'.2'-anthraquinone-azine, empirical formula $C_{28}H_{14}N_2O_4$.

Figure 4 applies to indigo, empirical formula $C_{10}H_{10}N_2O_2$.

The following examples illustrate how the invention may be carried into effect, all parts referred to being parts by weight:—

Example 1.

This deals with the preparation of a vat dyestuff derivative direct from flavanthrone (see Figure 1).

10 parts of flavanthrone are suspended in 70 parts of pyridine and to this suspension are added 10 parts of copper and 50 parts of the ethyl ester of mono-chlor-acetic acid. The contents are thoroughly stirred and heated to 100° C. for a short time until the reaction is complete. The colour changes rapidly to a deep blue-black. The mixture is then poured into water and thoroughly washed from pyridine and water-soluble materials. A deep blue-black paste is left on the filter.

Example 2.

This deals with the preparation of a vat dyestuff derivative direct from dimethoxy-dibenzanthrone (see Figure 2).

20 parts of zinc dust are intimately mixed with 10 parts of dimethoxy-dibenzanthrone and suspended in 200 parts of pyridine. To this mixture are then added, with thorough stirring at ordinary temperature, 100 parts of the ethyl-ester of mono-chlor-acetic acid. The mixture is stirred in the cold for a short time and finally heated to 100° C. until the reaction is complete. The mixture is then cooled and poured into water and worked up on the same lines. The resulting product is a dark brownish-red paste.

Example 3.

This deals with the preparation of a vat dyestuff derivative direct from indanthrone (see Figure 3).

3 parts of indanthrone, 3 parts of zinc, 30 parts of pyridine and 11 parts of mono-chloracetic ethyl ester are heated together for 15 minutes at 100 to 105°. The dark brown melt is cooled and poured into 300 parts of cold water. The supernatant liquid is decanted and a dark brown residue remains.

Example 4.

This deals with the preparation of an intermediate body suitable for the manufacture of dyestuffs and other bodies direct from indigo (see Figure 4).

1 part of indigo, 1 part of zinc dust, 6 parts of pyridine and 2 parts of mono-chloracetic ethyl ester are heated together at from 100 to 110°. There is a vigorous reaction so that the pyridine boils. When this reaction has subsided the melt is stirred for half an hour while cooling. It is then added to 60 parts of cold water whereby a brown tarry residue is precipitated.

Example 5.

This deals with the extraction by alkali of a dyeing compound from the flavanthrone vat dyestuff derivative of Example 1.

The blue-black paste is treated with warm caustic soda of about 5 per cent strength and about 60 to 80° C. and yields a deep blue-violet solution.

Example 6.

This deals with the extraction by alkali of a dyeing compound from the dimethoxy-dibenzanthrone vat dyestuff derivative of Example 2.

The dark brownish-red paste is treated with a solution of caustic soda as in Example 5 and yields a deep red solution.

Example 7.

This deals with the production of an alkali compound from the indanthrone vat dyestuff derivative of Example 3.

The dark brown residue of Example 3 is extracted with 1,200 parts of 1 per cent sodium hydroxide at 60° C., yielding a dark brown solution.

After the alkali extraction, the residue that remains is soluble to some extent in pyridine, and from the pyridine extract of such residue a reddish-brown substance can be obtained by the addition of water to the pyridine, from which indanthrone does not appear to be regenerated by treatment with acid oxidizing agents.

Example 8.

This deals with the dyeing of textile fibres, for example cotton and wool.

The products prepared according to Examples 5, 6 and 7 may be utilized for dyeing by immersion of the materials to be dyed into an appropriate solution and development of the colour by hydrolysis and oxidation, for instance by immersion in a bath of an oxidizing agent which may be an acid oxidizing agent for example an acid solution of ferric chloride. The colours obtained correspondent apparently to those of the original vat dyestuff, namely, in the case of flavanthrone yellow, dimethoxy-dibenzanthrone green and indanthrone blue.

Example 9.

This deals with the employment of products of some of the processes referred to above for printing.

According to this example the products of Example 6, 7 and 8 are printed by making them into a thin paste with a 5% solution of caustic soda (for example 3 parts of the flavanthrone products weighed after drying to 27 parts of the caustic soda solution) and then well mixing this paste with a thickening (70 parts for the quantities given above) containing one part of British gum to one part of water. The resulting paste is printed on textile material in the usual manner, dried, steamed in a Mather and Platt or other steamer and then treated by immersion in a bath of an oxidizing agent which may be an acid oxidizing agent for example an acid solution of ferric chloride.

General.

In place of pyridine in the above examples other organic tertiary bases of the type of pyridine, quinoline or their homologues may be employed and part of the base may be replaced by a neutral diluent as shewn for instance by Example 6.

Of the various starting materials we believe that a residue of the chlor-acetic-ester enters into the final product but the final product does not contain chlorine. The final products appear to be the alkali salts of an acid derivative of the dyestuff reduction product since they may be extracted with alkali and reprecipitated by acids. Pyridine does not appear to enter into the final product but apparently acts as a solvent or medium in which the reaction can take place.

This is not necessarily the only function of the pyridine or the like because pyridine plays an important but unexplained role in many condensations. The metal does not enter into the final product. Our present view is that in conjunction with the pyridine or the like this function is to remove the chlorine from the chlor-acetic-ester enabling the latter to condense with the dyestuff.

The metal does not behave as a reducing agent in the ordinary sense of the word since there is present in the melt neither acid nor water.

Having now described our invention what we claim as new and desire to secure by Letters Patent is:—

1. A process for the preparation of a vat dyestuff derivative direct from indanthrone which consists in heating together the following bodies in approximately the amounts specified, viz:—3 parts of indanthrone, 3 parts of zinc, 30 parts of pyridine, and 11 parts of mono-chlor-acetic ethyl ester for about 15 minutes at about 100–105° C., cooling the melt and pouring it into about 300 parts of cold water.

2. In a process for the production of a vat dyestuff derivative the step which comprises bringing together a vat dyestuff and an alkyl ester of mono-chlor-acetic-acid.

3. A process according to which vat dyestuffs are acted upon with an alkyl ester of mono-chlor-acetic-acid in the presence of pyridine and a metal selected from copper and zinc.

4. A process according to which vat dyestuffs are acted upon with an alkyl ester of mono-chlor-acetic-acid in the presence of a liquid tertiary organic base and a metal selected from copper and zinc.

5. A process according to which vat dyestuffs are acted upon with an alkyl ester of mono-chlor-acetic-acid in the presence of pyridine and zinc.

6. A process according to which indanthrone is acted upon with an alkyl ester of mono-chlor-acetic-acid in the presence of a liquid tertiary organic base and a metal selected from copper and zinc.

7. Vat dyestuff derivatives such as may be made by acting upon vat dyestuffs with an alkyl ester of mono-chlor-acetic-acid in the presence of a liquid tertiary organic base and a metal selected from copper and zinc.

8. Vat dyestuff derivatives such as may be made by acting on vat dyestuffs with an alkyl ester of mono-chlor-acetic-acid in the presence of a liquid tertiary organic base and a metal selected from copper and zinc and extracting the derivative with alkali.

9. A vat dyestuff derivative such as may be made by acting on indanthrone with an alkyl ester of mono-chlor-acetic-acid in the presence of pyridine and zinc.

10. A vat dyestuff derivative such as may be made by acting upon indanthrone with an alkyl ester of mono-chlor-acetic-acid in the presence of pyridine and zinc and subsequently treating the product with alkali.

In testimony whereof we have signed our names to this specification.

BIRKETT WYLAM.
JOHN EDMUND GUY HARRIS.
JOHN THOMAS.